(12) United States Patent
Hunter et al.

(10) Patent No.: US 9,397,516 B2
(45) Date of Patent: Jul. 19, 2016

(54) APPARATUS AND METHOD FOR RAPIDLY CHARGING BATTERIES

(75) Inventors: Ian Hunter, Lincoln, MA (US); Serge R. Lafontaine, Lincoln, MA (US)

(73) Assignee: Nucleus Scientific, Inc., Lincoln, MA (US)

( * ) Notice: Subject to any disclaimer, the term of this patent is extended or adjusted under 35 U.S.C. 154(b) by 1228 days.

(21) Appl. No.: 13/278,963

(22) Filed: Oct. 21, 2011

(65) Prior Publication Data

US 2012/0098481 A1    Apr. 26, 2012

Related U.S. Application Data

(60) Provisional application No. 61/405,829, filed on Oct. 22, 2010.

(51) Int. Cl.
*H02J 7/00* (2006.01)

(52) U.S. Cl.
CPC ............. *H02J 7/0072* (2013.01); *Y02B 40/90* (2013.01)

(58) Field of Classification Search
CPC ...................................... H02J 7/0091
USPC .................................. 320/152, 119
See application file for complete search history.

(56) References Cited

U.S. PATENT DOCUMENTS

| | | | |
|---|---|---|---|
| 5,684,387 A | 11/1997 | Patino | 320/30 |
| 5,773,956 A | 6/1998 | Wieczorek | 320/30 |
| 5,969,508 A | 10/1999 | Patino et al. | 320/153 |
| 5,986,430 A * | 11/1999 | Fernandez et al. | 320/106 |
| 6,534,954 B1 * | 3/2003 | Plett | H01M 10/48 320/132 |
| 7,249,080 B1 | 7/2007 | Hoffman et al. | 705/36 |
| 7,321,220 B2 * | 1/2008 | Plett | 320/128 |
| 7,511,457 B2 * | 3/2009 | Emori | B60L 3/0046 320/116 |
| 7,898,220 B2 | 3/2011 | Guang et al. | 320/135 |
| 8,138,723 B2 * | 3/2012 | Carkner | 320/137 |

(Continued)

FOREIGN PATENT DOCUMENTS

| | | | |
|---|---|---|---|
| EP | 1 536 539 | 6/2005 | ............ H01M 10/44 |
| EP | 2 124 288 | 11/2009 | ............ H01M 10/48 |

(Continued)

OTHER PUBLICATIONS

Jae Woo Wee, Authorized Officer Korean Intellectual Property Office, *International Search Report and Written Opinion of the International Searching Authority*—International Application No. PCT/US2011/057338, dated Jun. 26, 2012 (8 pages).

(Continued)

*Primary Examiner* — Edward Tso
*Assistant Examiner* — Ahmed Omar
(74) *Attorney, Agent, or Firm* — Sunstein Kann Murphy & Timbers LLP

(57) ABSTRACT

An apparatus and methods for ultra-fast charging one or more batteries, including, for example, lithium ion batteries. A charging current is determined by optimization of a model based on functions of a set of internal state variables associated with a battery, and a set of model parameters or nonparametric data characterizing the battery. Instantaneous internal state variables are determined, and an optimized charging current is applied to the battery subject to a set of battery-specific constraints. Internal state variables are updated recursively based on behavior of the battery under charge as well as the behavior, stored in a database, or acquired via a network, of cognate batteries.

37 Claims, 10 Drawing Sheets

(56) References Cited

U.S. PATENT DOCUMENTS

| | | | |
|---|---|---|---|
| 8,346,693 B2 * | 1/2013 | Al-Duwaish | G05B 17/02 700/28 |
| 8,589,096 B2 * | 11/2013 | Kim et al. | 702/63 |
| 2002/0047711 A1 * | 4/2002 | Bertness et al. | 324/426 |
| 2005/0187643 A1 * | 8/2005 | Sayyar-Rodsari | G05B 13/042 700/29 |
| 2006/0284600 A1 * | 12/2006 | Verbrugge | 320/132 |
| 2007/0139006 A1 * | 6/2007 | Yasuhito et al. | 320/116 |
| 2007/0299620 A1 | 12/2007 | Yun et al. | 702/63 |
| 2008/0169789 A1 * | 7/2008 | Yamabe | 320/136 |
| 2009/0091299 A1 * | 4/2009 | Lin et al. | 320/137 |
| 2009/0104510 A1 | 4/2009 | Fulop et al. | 429/50 |
| 2009/0256528 A1 * | 10/2009 | Greening | H01M 10/0525 320/162 |
| 2009/0265121 A1 * | 10/2009 | Rocci et al. | 702/57 |
| 2010/0001693 A1 * | 1/2010 | Iida | G01R 31/3679 320/134 |
| 2010/0019732 A1 * | 1/2010 | Utsumi et al. | 320/136 |
| 2010/0090650 A1 * | 4/2010 | Yazami et al. | 320/132 |
| 2010/0148731 A1 | 6/2010 | Notten et al. | 320/162 |
| 2010/0153038 A1 * | 6/2010 | Tomura | G01R 31/3624 702/63 |
| 2010/0253281 A1 * | 10/2010 | Li | H02J 7/0027 320/108 |
| 2013/0271089 A1 * | 10/2013 | Yazami et al. | 320/162 |

FOREIGN PATENT DOCUMENTS

| | | | | |
|---|---|---|---|---|
| JP | 05-227603 | 9/1993 | | B60L 3/00 |
| JP | 2004-79316 | 3/2004 | | H01M 10/44 |
| JP | 2008-59910 | 3/2008 | | H01M 10/48 |
| JP | 2008-308030 | 12/2008 | | B60W 10/26 |
| KR | 10-2003-0078290 | 10/2003 | | H02J 7/00 |
| KR | 10-2004-0095213 | 11/2004 | | H02J 7/02 |

OTHER PUBLICATIONS

Kim et al., "Three-Dimensional Lithium-Ion Battery Model: Understanding Spatial Variations in Battery Physics to Improve Cell Design, Operational Strategy, and Management," *National Renewable Energy Laboratory* (*NREL*), *A national laboratory of the U.S. Dept. of Energy, Office of Energy Efficiency & Renewable Energy*, 4th International Symposium on Large Lithium Ion Battery Technology and Application, 35 pages (May 2008).

Korenberg et al., "The Identification of Nonlinear Biological Systems: LNL Cascade Models," *Biol. Cybern.*, vol. 55, pp. 125-134 (1986).

Korenberg et al., "The Identification of Nonlinear Biological Systems: Wiener Kernel Approaches," *Annals of Biomedical Engineering*, vol. 18, pp. 629-654 (1990).

Korenberg, "Two Methods for Identifying Wiener Cascades Having Noninvertible Static Nonlinearities," *Annals of Biomedical Engineering*, vol. 27, pp. 793-804 (1999).

Maxim Integrated Products, Inc., "How to Design Battery Charger Applications that Require External Microcontrollers and Related System-Level Issues," Application Note 680, 13 pages (2002).

MicroChip Technology, Inc., "Power Management in Portable Applications: Charging Lithium-Ion/Lithium-Polymer Batteries," MicroChip AN947, DS00947A-pp. 1-16 (2004).

MicroChip Technology, Inc., "Single Chip Field Reprogrammable Battery Manager," MicroChip PS501, DS21818C-pp. 1-42 (2004).

Milocco et al., "State of charge estimation in Ni-MH rechargeable batteries," *J. Power Sources*, vol. 194, pp. 558-567 (2009).

Speltino et al., "Experimental Validation of a Lithium-Ion Battery State of Charge Estimation with an Extended Kalman Filter," *Proceedings of the 2009 European Control Conference*, 6 pages (2009).

"Smart Battery Charger Specification," Rev. 1.1, 39 pages (1998).

European Patent Office, Supplementary European Search Report—Application No. 11 83 5237, mailed Apr. 24, 2015 (7 pages).

Bhangu et al., "Nonlinear Observers for Predicting State-of-Charge and State-of-Health of Lead-Acid Batteries for Hybrid-Electric Vehicles," *IEEE Transactions on Vehicular Technology*, vol. 54, No. 3 (2005).

Hunter et al., "The Identification of Nonlinear Biological Systems: Wiener and Hammerstein Cascade Models," *Biol. Cybern.*, vol. 55, pp. 135-144 (1986).

Johnson et al., "Temperature-Dependent Battery Models for High-Power Lithium-Ion Batteries," *Dept. of Energy, U.S. National Renewable Energy Laboratory* (*NREL*), 12 pages (2000).

Kim, "The novel state of charge estimation method for lithium battery using sliding mode observer," *J. Power Sources*, vol. 163, pp. 584-590 (2006).

* cited by examiner

APPARATUS AND METHOD FOR RAPIDLY CHARGING BATTERIES

The present application claims the priority of U.S. Provisional Patent Application Ser. No. 61/405,829, filed Oct. 22, 2010, and incorporated herein by reference.

TECHNICAL FIELD

The present invention relates to charging electrochemical cells, and, more particularly, to an apparatus and methods for charging lithium ion batteries.

BACKGROUND ART

Definitions

As used in this description and any accompanying claims, unless the context requires otherwise, a "battery" shall refer to one or more chemical energy storage cells (or, electrochemical cells) that provide an electrical potential. A "secondary battery" shall refer to a battery that can be charged, or recharged, by application of electrical current.

The process of charging an electric battery consists of forcing a current into the battery such that it accumulates a charge, and thus, energy. The process must be carefully controlled. Typically, excessive charging rates or charging voltage will permanently degrade the performance of a battery and eventually lead to complete failure, or even a catastrophic failure such as perforation of the case and explosion or leakage of highly corrosive chemicals.

The process of charging electrochemical cells connected in series requires special care. Recharging such batteries may lead to cell damage caused by reverse charging when fully discharged. Some chargers are designed to recharge such batteries and they typically involve monitoring the voltage across individual cells. Special charging techniques are used to charge the individual cells uniformly.

The normal battery charging process consists of either two or four distinct phases, depending on the battery type, as taught, for example, in *Application Note* 680 of Maxim Integrated Products, Inc., available at http://www.maxim-ic.com/app-notes/index.mvp/id/680 (2002). A first optional phase, mostly used with Nickel-Cadmium (NiCad) batteries having significant memory effects, consists in the full discharge of the battery. The second phase, referred to as "bulk" phase or "Fast-Charge Phase and Termination," consists in forcing a constant current until some criterion is met, such as reaching a constant voltage or decline in current. If "C" is the battery capacity in A·h, a unit of charge (often denoted by Q), the current, in amperes, is selected as a fraction (or multiplier) of C. For example, fast-charging a 1.2 A·hNi-MH battery at 2.4 A or 2*C constant current would recharge the battery in ½ hour if the charging was done without losses, which is typically not the case. The charger limits both the current and charging voltage, typically to an accuracy of 0.75% (30 mV for a single cell of 4V) for a Lithium-Ion cell. Termination consists either of detecting when the current decreases below a certain value, or is based on a fixed time elapsed after the voltage reached its maximum value.

The third phase, or "Top-Off Charge" phase, consists in forcing a small current to achieve the full battery charge. This phase terminates either when the voltage has reached a maximum value, or after a certain Top-Off charging time or battery temperature.

The fourth phase, or "Trickle Charge" phase, is typically used for all battery (chemistry) types except Li-Ion batteries. The purpose of this "Trickle Charge" phase is to compensate for normal internal leakage of the battery and loss of charge with time. In this phase either a low current (C/16 to C/50 is the common range) is applied, or pulses are applied with a low duty cycle such that the average current is small (e.g. C/512).

Existing battery charging protocols are deficient in that they are slow, and in that they cause unnecessarily shortened battery lifetimes. Existing protocols fail to account for variations across batteries, even among batteries of the same manufacturing batch.

SUMMARY OF EMBODIMENTS OF THE INVENTION

In accordance with embodiments of the present invention, an apparatus is provided for charging a battery. The apparatus has an interface for electrical coupling to the battery and circuitry for concurrently measuring battery voltage and current. Additionally, the apparatus has a database for accumulating battery parameter data from a plurality of batteries, and a processor for recursively updating data characterizing a model representing the battery based both on jointly measured battery voltage and current and accumulated parameter data received from the database. Finally, the apparatus has a current supply (as defined herein) for supplying current for charging the battery as governed by the processor.

In other embodiments of the invention, the processor may be adapted for updating a dynamic representation of cell dynamics for the battery based at least in part upon system identification, or upon nonlinear system identification.

In alternate embodiments, the circuitry for concurrently measuring battery voltage and current may include a four-port configuration, and the interface for electrical coupling to the battery may be adapted for coupling to reference electrodes of the battery. The processor may have an input for receiving a signal from a sensor sensitive to a characteristic of the battery. The apparatus may also have a temperature controller for controlling a temperature of the battery.

In accordance with another set of embodiments of the invention, a method is provided for charging a battery. The method has steps of
  a. providing a dynamic representation of cell dynamics for the battery;
  b. determining a charging profile for the battery based on the dynamic representation; and
  c. applying an optimized charging current to the battery based, at least in part, on the charging profile and on tracking total charge that has been stored in the battery.

In further embodiments, the step of applying the optimized current may be subject to a set of battery-specific constraints, which, in turn, may be derived on the basis of an iterative sequence of charge/discharge cycles. The charging profile, more particularly, may be a charging current profile.

The method may have a further step of tracking the temperature of the battery, wherein applying an optimized charging current to the battery is also based, at least in part, on the tracked temperature of the battery. Applying the optimized current may be based, at least in part, on tracking instantaneous state variables for the battery. Tracking the total charge may comprise determining at least one instantaneous internal state variable for the battery during charging the battery, or determining at least one instantaneous internal state variable for the battery during discharging the battery.

In accordance with other embodiments of the invention, the dynamic representation of cell dynamics for the battery may be derived by means of nonlinear system identification. It may also include a set of internal state variables and/or a set of model parameters. Moreover, it may include non-parametric data characterizing a model, at least in part.

The step of determining a charging profile for the battery may be performed during a course of discharging the battery, and/or charging the battery.

Where a set of model parameters is employed, it may include parameters derived from a database, and, more particularly, a database updated during the course of charging the battery. The dynamic representation of cell dynamics for the battery may include a set of internal state variables specific to a particular individual cell, or a set of model parameters specific to a genus of cells. The dynamic representation may also be based, at least in part, on charge/discharge cycles of a plurality of networked charging systems.

In accordance with yet another set of embodiments of the invention, a network is provided for deriving empirical battery model data. The network has a plurality of charging systems, where each charging system includes a processor and a power supply for supplying current to a separate battery. The network also has a server for receiving data from each of the plurality of processors and for returning updated data with respect to a dynamic representation of cell dynamics for incorporation by each of the plurality of charging systems.

In further embodiments, the processor of at least one of the plurality of charging systems is adapted for updating a dynamic representation of cell dynamics for the battery based at least in part upon system identification or nonlinear system identification.

BRIEF DESCRIPTION OF THE DRAWINGS

The foregoing features of the invention will be more readily understood from the following detailed description, considered with reference to the accompanying drawings, in which:

FIG. 1A is a minimal circuit schematic of a simple battery model, while FIG. 1B is a Thevenin model of a battery, both prior art models;

DETAILED DESCRIPTION OF SPECIFIC EMBODIMENTS

Definitions

Figure 1:
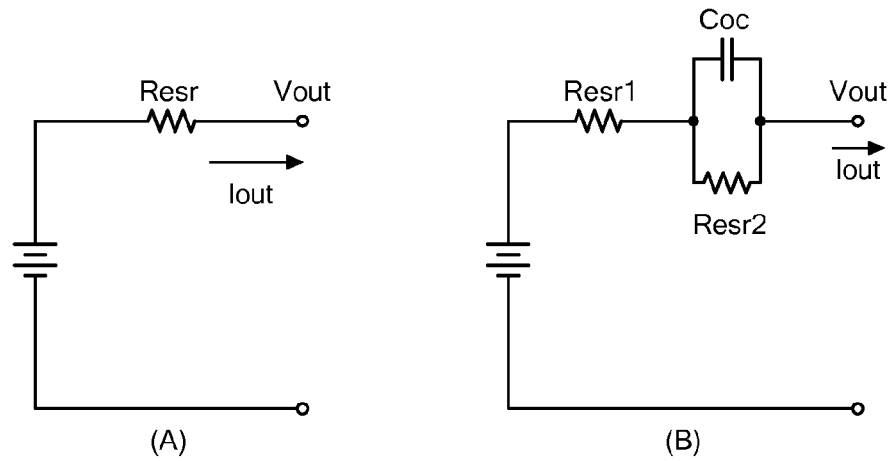

As used herein, and in any appended claims, the term "current supply" shall refer generally to a power source that delivers electrons to a component of a system and is not used in a sense restricted to delivery of a controlled current but may encompass, as well, a source that provides a specified potential across a component and delivers such current as required to maintain the specified potential (i.e., a "voltage source"). Similarly, application of a "charging current" shall subsume the application of a charging voltage.

Unless the context otherwise requires, the term "dynamic representation" shall denote a model of the behavior of a system that evolves in time, either parametric or non-parametric, and in which the independent variable of time is expressly incorporated.

While the term "dynamic representation" refers to a model of a system, the term "battery cell dynamics" shall denote the actual electrochemical behavior of a battery as a function of time under an entire manifold of battery conditions.

A "charging profile" is a function expressing voltage or current, or both, as a function at least of time (and, possibly, of other parameters, such as load or temperature or initial state of charge, for example).

"Optimized," as used herein, and in any appended claims, shall refer to a trajectory in the space of specified battery parameters that maximizes any utility function with respect to any norm, both as specified by a designer, and that may take into account such factors as duration of charge, battery lifetime, etc., cited by way of example and without limitation.

In the context of describing embodiments of the present invention, the term "battery" is mostly used in the sense of single-cell batteries. However, it is to be understood that fast charge techniques, practiced in accordance with embodiments of the present invention, may also be advantageously applied to batteries containing cells in series, and even to more complex battery systems.

Moreover, it is to be understood that embodiments of the invention described herein may also be applied with respect to a reference electrode, or additional electrodes against which the potential of another electrode may be measured. The use of such reference electrodes in rechargeable batteries is discussed, for example, in US Published Application 2009/0104510, which is incorporated herein by reference. The use of reference electrodes, or additional electrodes, may facilitate the fast charge methods described herein by more closely monitoring the internal state of electrochemical reactions inside the battery. In a similar manner additional sensors may be integrated inside, or in conjunction with, cells, such as temperature sensor, pH sensor, etc.

For purposes of circuit design, for charging or discharging a battery, the battery is often modeled, in order that it may be represented numerically. Various models include those based on networks of elemental electrical components (whether as complex-valued RLC impedances or, more generally, using SPICE (Simulation Program with Integrated Circuit Emphasis) or a SPICE-like non-linear simulation), those based on electrochemical models, and, finally, "black-box" or ad-hoc models based on either parametric or non-parametric representations. In accordance with embodiments of the present invention, representations of the battery may be parametric or non-parametric. For example, a battery model might be what the response of the system would be to an impulse of current in time, thus a continuous function of time would be a part of the model. The continuous function may then be digitized, as would normally be the case when in microprocessor-based controllers where sampled data systems are used. Furthermore for data reduction purposes and noise reduction analytic functions may be fitted to data sets, such as functions or functional. An impulse response function for example may be assumed of a second order and represented with only three free parameters.

An example of a battery charging model that may be employed, in accordance with the novel charging protocol that is taught in the present invention, is that of Speltino, et al., *Experimental Validation of a Lithium-Ion Battery State of Charge Estimation with an Extended Kalman Filter, Proceedings of the* 2009 *European Control Conference* (2009), which is incorporated herein by reference.

In a simplest form of model, a battery is represented as a constant voltage source. Usually, at a minimum, an equivalent series resistance Resr is added to the ideal cell to model its internal resistance and voltage drop with current, as shown in the simple battery model of FIG. 1A. The output voltage Vout in the presence of current Iout drawn by an external circuit is diminished with respect to the open circuit voltage Vocv by the voltage drop across Resr. Open circuit voltage is, realistically, a nonlinear function of the state of charge SOC or discharge, temperature and history. In the Thevenin (FIG. 1B) model a combination of capacitor Coc and resistor Resr2 in parallel is added after the series resistor Resr1 to represent overcharge.

Figure 2:
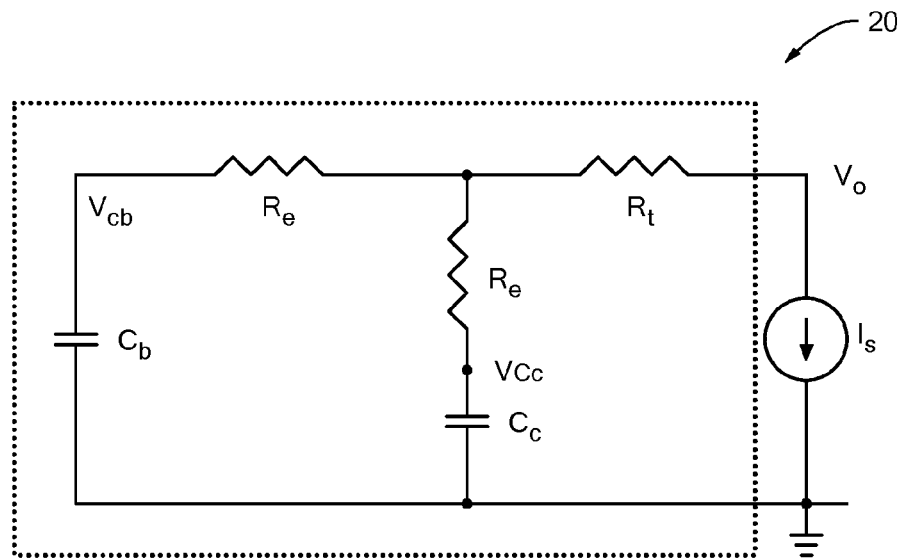
FIG. 2 depicts the National Energy Laboratory prior art lithium-ion battery model.

FIG. 2 shows the well-known National Energy Laboratory Lithium-Ion battery model ("the NREL model"), available at Johnson et al., http://www.nrel.gov/vehiclesandfuels/energystorage/pdfs/evs17poster.pdf, incorporated herein by reference. A battery, designated generally by numeral 20, in accordance with the NREL model includes a temperature-dependent network consisting of a two capacitor model, where the capacitor $C_b$ is directly related to the state of charge (SOC), and the voltage $V_{Cb}$ across $C_b$ represents the open circuit voltage (OCV). Variations on this model include variations in $R_e$, $R_c$ or $R_t$ as a function of the state of charge. The model provides the output voltage Vo as a function of series current Is.

More elaborate models represent the distributed, three-dimensional nature of batteries and electro-chemical processes, thermal and diffusion processes ongoing during charge and discharge. One such model developed by Kim and Smith at NREL, is available at http://www.nrel.gov/vehiclesandfuels/energystorage/pdfs/43166.pdf (2008), and is incorporated herein by reference. Typically, electro-chemical battery models involving finite element modeling techniques are developed to gain a more detailed understanding of batteries and ultimately improve their design.

System Identification and Parameter Estimation

Broad classes of models in terms of which battery charging and discharging may be represented within the scope of the present invention include: linear and nonlinear models; time invariant and time varying models; Laplace- (frequency-) domain and time-domain representations; lumped models, distributed models and finite-element models; "white-box" models based on first principles, "black-box" or ad-hoc models and "grey-box" hybrid models; models without memory and with memory.

Once a model has been chosen, the next step is to obtain numerical values for unknown coefficients, parameters, curves, and functionals (real-valued functions of a vector space, such as those expanded in terms of Volterra kernels, discussed below) using either a heuristic approach or more formal techniques known as system identification techniques. A number of techniques are available to obtain either such numerical values as are used in a parametric model or functions used in nonparametric models. All such techniques are within the scope of the present invention, as described below. Parametric and non-parametric models are not entirely disjunct classes in that functions may also be approximated by fitting curves with static parametric functions. The engineer or scientist has at his/her disposal a large array of techniques for fitting models to data, identifying numerical values for components, parameters and functions, validating models, estimating orders and complexity; estimating errors and uncertainties. Sources of such teaching include the following references, all of which are incorporated herein by reference:

Eykhoff, System Identification: Parameter and State Estimation, Wiley & Sons, (1974).

Goodwin et al., Dynamic System Identification: Experiment Design and Data Analysis. Academic Press (1977).

Graupe, Identification of Systems, (2nd ed., Krieger Publ. Co. (1976).

Ljung, System Identification—Theory for the User, 2nd ed, PTR Prentice Hall, (1999).

In most cases, before a system identification technique can be used, preliminary simplifications or assumptions are made with respect to the model and the modeled system. For example a linear model can be used with a nonlinear system, usually by linearizing around an operating point in which the input and output amplitudes are constrained to lie within a specified range.

Any finite-memory time-invariant nonlinear dynamic system can be represented with arbitrary precision with a finite order Volterra series, of the form:

$$y(t) = k_0 + \sum_{n=1}^{\infty} \frac{1}{n!} \int_{-\infty}^{\infty} k_n(s_1, s_2, \ldots, s_n) \times$$

$$(t-s_1) \times (t-s_1) \ldots \times (t-s_n) ds_1 ds_2 \ldots ds_n.$$

The kernals of the Volterra series are typically functionals, mapping vectors in parameter space to the underlying field, typically a scalar, such as a voltage or current. Closely related to the Volterra Series is the Wiener series. In the Wiener series the terms are orthogonalized for a purely random white noise input, and more readily identified using for example cross-correlation techniques.

Korenberg (in *Parallel Cascade Identification and Kernel Estimation for Nonlinear Systems, Annals of Biomedical*

*Engineering*, vol. 19, pp. 429-55 (1990) expanded the foregoing Fréchet theorem by proving that any discrete-time finite-memory system that can be represented by a finite Volterra series can also be represented by a finite series of parallel cascades of linear dynamic systems followed by a static nonlinearity (Wiener system or LN system). Wiener systems are instances of the class of models known as cascade or block structured systems, which also includes Hammerstein models consisting of a nonlinearity followed by a linear system (NL) and cascade systems including a linear system followed by a nonlinearity and followed by another linear system (LNL). Korenberg and Hunter developed efficient techniques to identify both Wiener (LN) and Hammerstein (NL) systems described in Hunter et al., *The Identification of nonlinear Biological Systems: Wiener and Hammerstein Cascade Models, Biological Cybernetics*, vol. 55 pp. 135-44 (1986). They also developed practical and efficient techniques to identify parallel cascade Wiener systems (PCWS). In accordance with other embodiments of the invention, general representations involving a parallel cascade of linear-system followed by a static nonlinearity and another linear system (LNL) may also be used, as described, for example, in Korenberg et al., *The Identification of Nonlinear Biological Systems: LNL Cascade Models, Biological Cybernetics*, vol. 55, pp. 125-34, (1986), which is incorporated herein by reference. It has, indeed, been demonstrated that every continuous discrete time system with finite memory can be uniformly approximated by a finite sum of LNL systems.

Additional explication of the use of nonlinear system identification, with respect, more particularly, to Wiener and Volterra kernels, may be found in the following references, all of which are incorporated herein by reference:

Korenberg, et al., *Exact Orthogonal Kernel Estimation From Finite Data Records: Extending Wiener's Identification Of Nonlinear Systems, Annals of Biomedical Engineering*, vol. 16, pp. 201-14 (1988);

Korenberg, et al., *The Identification of Nonlinear Biological Systems: Wiener Kernel Approaches, Annals of Biomedical Engineering*, vol. 18, pp. 629-54 (1990);

Korenberg, et al., *The Identification of Nonlinear Biological Systems: Volterra Kernel Approaches, Annals of Biomedical Engineering*, vol. 24, pp. 250-68 (1996)

An example of the identification of a battery charging system as a Weiner model comprising a cascaded dynamic linear component and static nonlinearity is provided by Milocco et al., *State of Charge Estimation in Ni-MH Rechargeable Batteries, J. Power Sources*, vol. 194, pp. 558-67 (2009), which is incorporated by reference herein. In accordance with embodiments of the present invention, nonlinear techniques such as those described and exemplified above may be employed prior to developing a charging technique, and may also be employed during the course of battery charging in order to refine estimates of model parameters.

Figure 12:
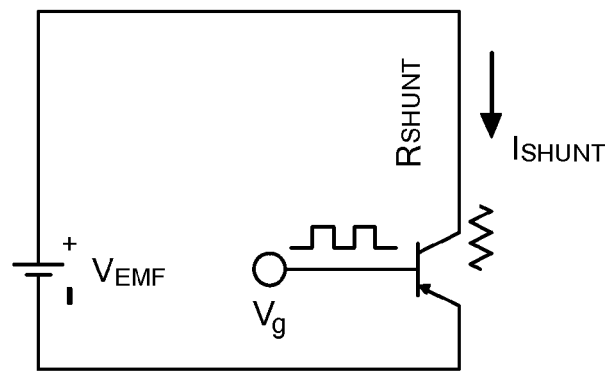
FIG. 12 is a simplified schematic of a circuit to be used, in accordance with an embodiment of the present invention, for imposing a perturbing load across a battery to enable measurements to be made during the course of battery discharge or quiescence.

In accordance with embodiments of the present invention, models may be estimated, or improved model parameters may be obtained, either during charging a battery, while it is drained for doing work, or when it is not in use. To this end, a special circuit may be designed and integrated into the device where the battery is used, or, otherwise, integrated in the battery casing. A simplified schematic of a circuit to be used in any of these cases is depicted in FIG. 12 where a field effect transistor (FET) or other suitable switching device is used with a shunt resistor ($R_{shunt}$) to draw current from the cell while cell voltage and shunt current ($I_{shunt}$) are measured. The gate voltage would be controlled by a microprocessor to provide either a very high frequency pulse frequency modulated signal (PFM), or pulse-width-modulation signal (PWM) or any type of pulse modulation, to results in a quasi-continuous variation of current and voltage with required excitation spectra, or discrete current changes are used to provide a quasi-random pseudo binary sequence (PRBS) that is suitable for system identification. (It should be understood that "very high frequency" is indicated by way of preferred embodiment, however, the scope of the present invention is not limited thereby.)

Figure 13:
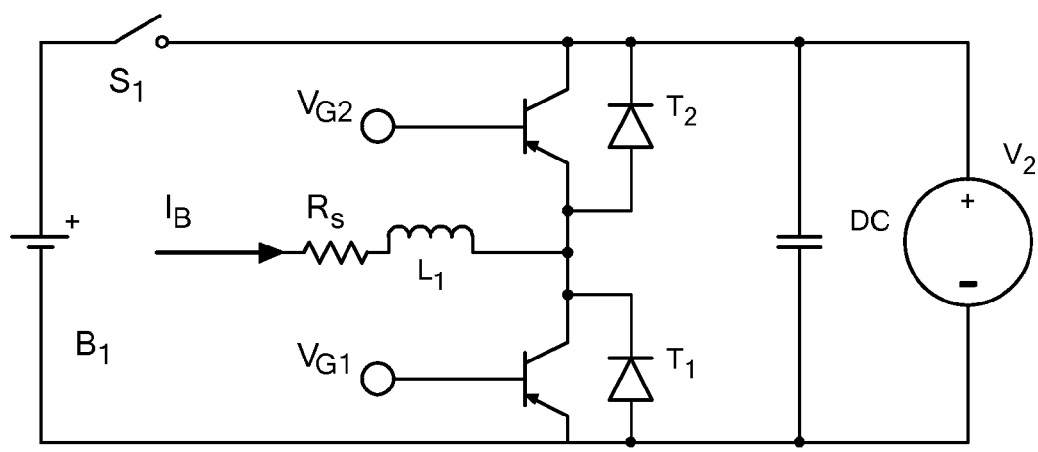
FIG. 13 is a simplified schematic of a circuit to be used, in accordance with an embodiment of the present invention, for imposing a perturbing load across a battery to enable measurements to be made during the course of battery charging, discharging, or quiescence.

The circuit depicted in FIG. 12 presents disadvantages, such as potentially discharging the cell, and testing the cell with only discharging current, whereas it may be desirable to test the cell using both charging and discharging currents. In order to circumvent these difficulties, active circuits may be employed that minimize battery losses while providing excitation currents of both polarities (charging and discharging). A simplified schematic of such a circuit is depicted in FIG. 13. In FIG. 13, two switching devices, T1 and T2, such as low-loss FETs, are used. Transistor T1 and inductor L1 are used to draw energy from the cell "B1" and pump it into a capacitor C1. When the voltage across capacitor C1 exceeds the cell voltage by a few volts, transistor T2 and inductor L1 are used to pump current back into the battery. During this process, the cell voltage Vemf and cell current IB may be measured by a microprocessor for system identification purposes. The battery current IB is measured with an appropriate current sensor, such as a low resistance, low induction current sense resistor or Hall Effect sensor. The capacitor C1 may be maintained at the cell voltage when testing is not being done by a switch such as a relay S1. Normally the relay is closed, and it is opened before starting system identification experiments.

Figure 14:
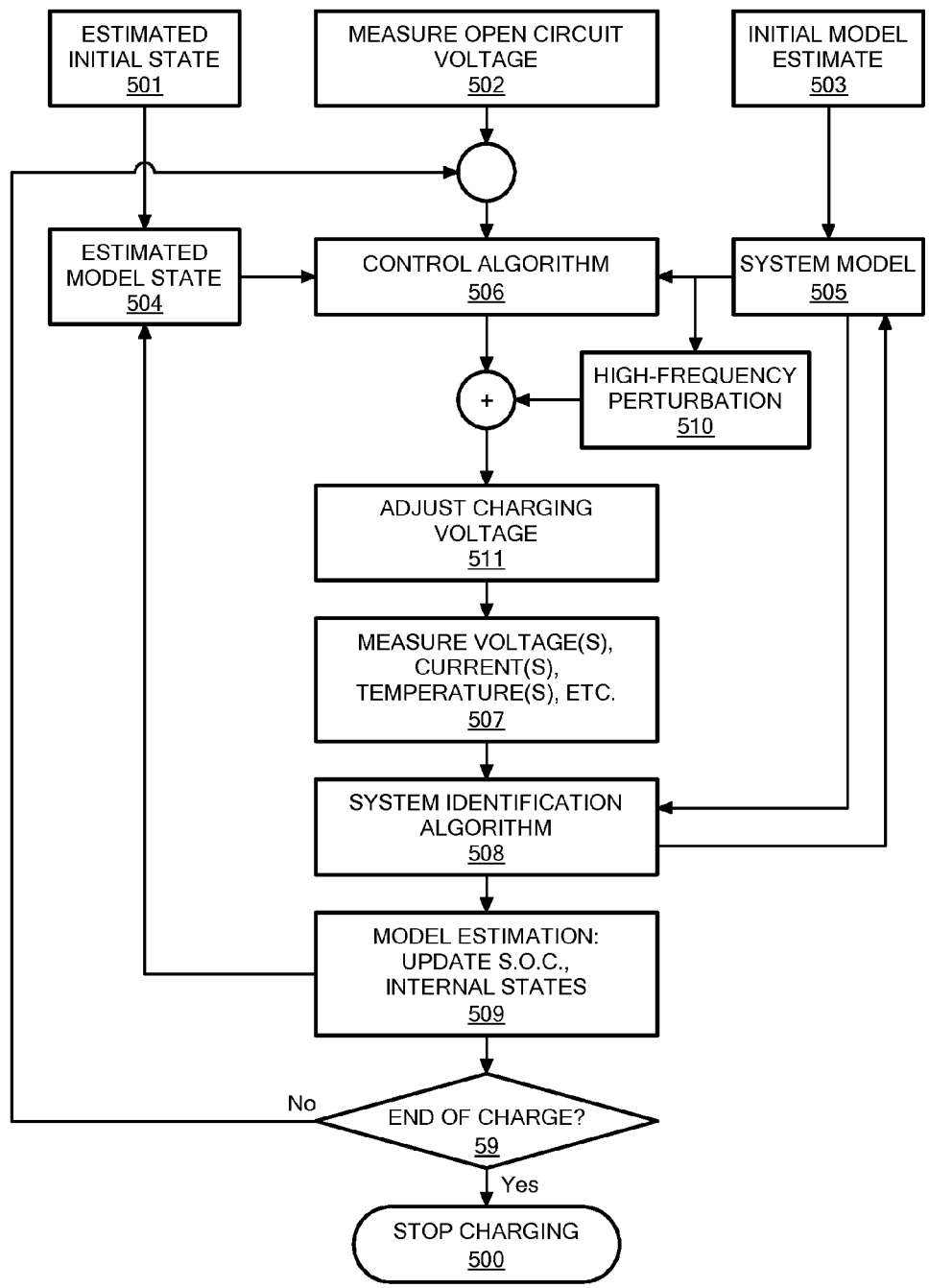
FIG. 14 is a flowchart depicting a method for perturbing the state of a battery during the course of charge or discharge and for applying a solution to a charging problem, in accordance with an embodiment of the present invention.

When the battery is under charge, circuits such as those described above may be used in conjunction with charger 520 (shown in FIG. 5B) to provide a small perturbation on top of the charging current, as shown in the flowchart of FIG. 14. Moreover, the logic for providing the requisite perturbations to the cell as shown in FIG. 1, may be integrated into battery charger 520. In this case, the charger calculates, in real time, the high frequency perturbation signal to apply, point by point, and adds it to the charging voltage or current. This calculation is typically performed in real time, during the course of battery charging. Alternatively, charger 920 may include a separate circuit such as depicted in FIG. 13, in parallel with its specialized charging circuit, but where C1 may either be replaced with, or in parallel with, another voltage source, V2, that is higher in voltage than the cell voltage Vemf. For simplicity, and in order to reduce space requirements, inductor L1 may be replaced with a power resistor, at the cost of a slight energy loss.

The cell model can be used for several purposes besides charging purposes. One important parameter that is typically estimated is the current amount of energy (in Joules), the capacity left in the battery (in Coulomb), normally referred to as State of Charge (SOC), which can be either used in an external display either in absolute or relative value, and to turn off power when the cell capacity has reached a lower limit that is safe for the battery. Continuously re-estimating cell characteristics also provides an accurate estimate of the cell state when starting a new charge cycle. A cell model, SOC, and estimated cell temperature information may all be used also for adjusting the mode in which a device is used.

In system identification non-parametric models are typically associated with a "black-box representation" of a system, meaning that the model itself does not necessarily yield to any insight into the system, such as its physics, chemistry, electrical properties, etc. Models developed with a-priori knowledge of a system normally yield parametric models or distributed finite element models (FEM). However mathematical techniques exist to map models from one space to another, i.e. from a non-parametric model to a parametric form. In this way, for example, a nonlinear Wiener model consisting of a linear system, as represented by its impulse response, followed by a static nonlinearity, may be converted to a parametric linear model (e.g. state-space or transfer function) followed by a static nonlinearity. Then the parametric model may more easily be amenable to the estimation of internal processes in the system. Furthermore estimating first a non-parametric model and then converting it to a parametric form is often a more robust technique of parameter estimation. In this way it is still possible to obtain from a non-parametric model and a-priori knowledge about the system structure to estimate the state of the system (e.g., the SOC of various compartments) or parameters (resistance, capacitance, etc.).

Design of Charging Profile

In order to develop a charging strategy, first, a set of physical constraints and limits of the battery must be known. For example, exceeding some limits, such as over-voltage, or current, or cell temperature, may permanently degrade the performance of a battery, thus, such limits impose constraints on battery charging. For an optimized fast charge algorithm, the goal to achieve is preferably expressed as an objective function. As used herein, and in any appended claims, the term "objective function" refers to a real function of one or more parameters that an optimization routine seeks to minimize or maximize subject to a specified set of constraints.

In additions to modeling electrical parameters, such as cell voltage and current, models can be also be used, in accordance with embodiments of the present invention, also to include other variables such as cell temperature, internal pressure, etc.

In the simplest case, the objective function would be minimization of the charging time. For example if the battery could be approximated by a capacitor C with a series resistor R, where $I_{max}$ is the current limit and $V_{max}$ is the breakdown voltage across the capacitor, then the problem to be solved is that of finding I(t) which minimizes charging time T given the integral equation:

$$V_{max} = C \int_0^T I(t)dt, \text{ subject to the constraint} \quad \text{(Eqn. 1)}$$
$$0 \le I(t) \le I_{max} I(t) \le I_{max\square}.$$

The solution to this problem, and, similarly, the solutions for all linear battery models, is readily available from optimal control theory, and the solution is in the form of bang-bang control: the current I is switched between $I_{max}$ and 0 when "switching points" are reached, where solution subject to switching points is well known in control theory. For the simple capacitor model, the maximum permissible current would be used until the full charge is achieved.

In practice, however, the voltage V across the capacitor cannot be measured directly due to the internal resistance represented by the resistor R. The voltage Vout(t) that is actually measured across the capacitor is $V_{out}(t)=V(t)+R \cdot I(t)$, while the voltage $V_s$ required from the power source is $V_s(t)=V(t)+(R+R_s) \cdot I(t)$, where $R_s$ s is a further series resistance associated with the connection of the battery to the charging circuit.

In order to minimize battery charging time, the parameters R and $R_s$ must be known. $R_s$ can be neglected in most cases, yet this is not the case for lithium ion batteries where currents exceeding 25 A may be drawn and where even a connection with a resistance of 1 mΩ would create a significant voltage drop of 25 mV. $R_s$, in principle, can be obtained by measuring the resistance of the lead connecting the supply source to the capacitor. However, a better solution is available in the form of a four-wire configuration as described with reference to FIG. 3. Four leads are used: two leads 32 and 33 comprise a wire pair carrying charging current, while leads 34 and 35 are used to measure the voltage $V_{out}$. Since the circuitry 36 used to measure the voltage has very high input impedance, only a negligible current flows in the wires 34, 35 used to monitor $V_{out}$, and the measuring error is negligible. It is to be understood that, within the scope of the present invention, coupling to the battery, whether for application of current or for measurement of voltage or any other quantity, may be wholly, or in part, inductive or wireless.

The parameter R is typically derived by experiments and system identification. In accordance with preferred embodiments of the present invention, the parameter R, like other data characterizing kernels of a Volterra series or characterizing other models, may be derived and updated during the course of the charging and/or discharging cycle of a cell or battery of cells. Deconvolution, for example, of the measured voltage from the applied current yields the resistance R. Measurements performed during the course of charging or discharging normally include high frequency "perturbations" with a spectra exceeding the internal cell dynamics relevant to the charging process.

Often, simple heuristic techniques can be used for some parameters. As an example, for the circuit depicted in FIG. 3, a current step $I_0$ may be applied and the voltage across the capacitor measured. The ideal charging curve 40 in that circumstance is shown in FIG. 4. Application of current step $I_0$ results in an effectively instantaneous jump in voltage $V_0$ across the capacitor, so that the internal capacitance resistance can be derived as $$R = \frac{V_0}{I_0}.$$

Figure 3:
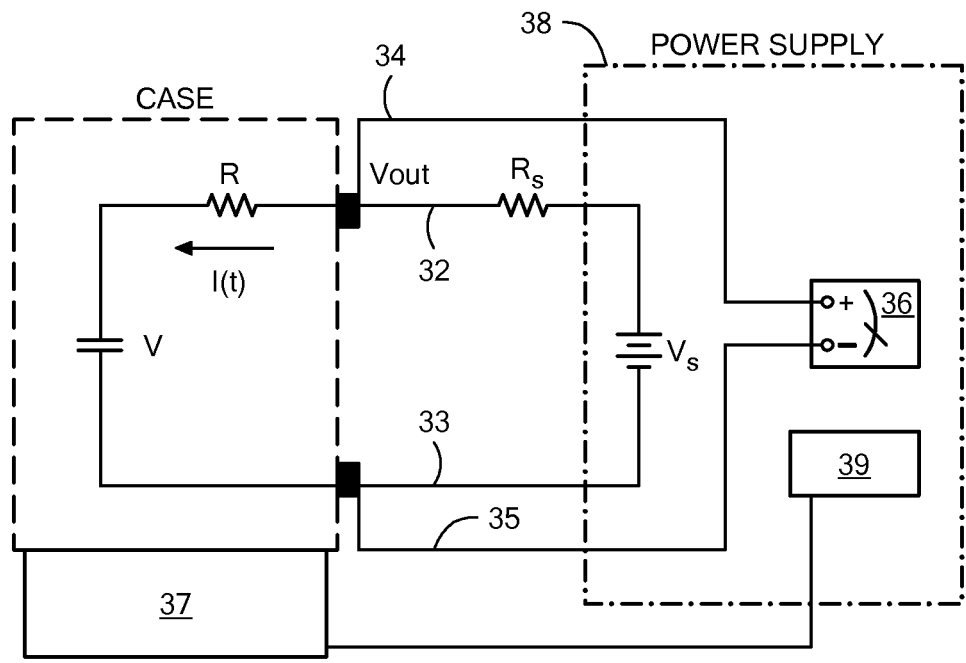
FIG. 3 is a circuit diagram depicting a model, in terms of which circuit parameters may be derived using a four-wire configuration, in accordance with an embodiment of the present invention.
Figure 4:
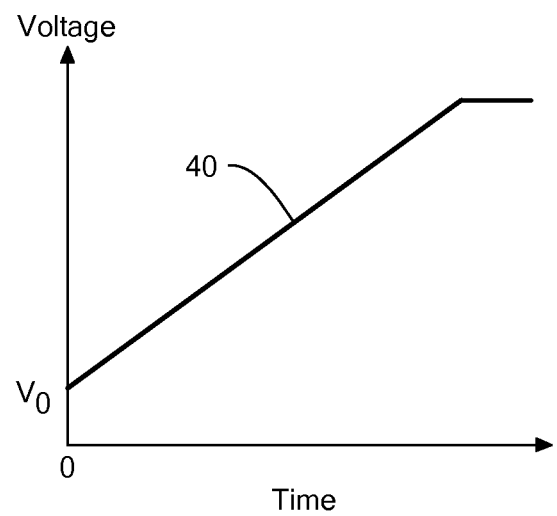
FIG. 4 is a plot of an ideal charging curve based on a simple heuristic applied to the circuit of FIG. 3.

The simplest optimal charging protocol for the system described in terms shown in FIG. 3 consists of the following:
Control Vs to maintain a current $I=I_{max}$ until $V_{out}=V_{max}+R \cdot I_{max}$, where $V_{max}$ is the maximum permissible internal voltage; then
Control Vs such that $V_{out}=V_{max}+R \cdot I$ until I falls below a given threshold.

In accordance with certain embodiments of the invention, during the above procedure the temperature of the battery is actively controlled by temperature controller 37, which may be a Peltier-effect controller, or any other type of temperature controller.

Typically, the objective function in the charging of a battery is defined as a function of total charging time, efficiency, device internal heating, and a current limit that is derived from either the manufacturer specification or through measurements. Generally, the charging problem can be expressed as:

$$\text{Maximize } J(x,p) \text{ subject to } A \cdot x \le b, \quad \text{(Eqn. 2)}$$

where x represents the vector of internal state variables of the device, p represents the vector model parameters, and b represents limits not to be exceeded. The state variables include internal voltages and currents, while parameters would include internal resistances, capacitances, inductances, etc.

Figure 5A:
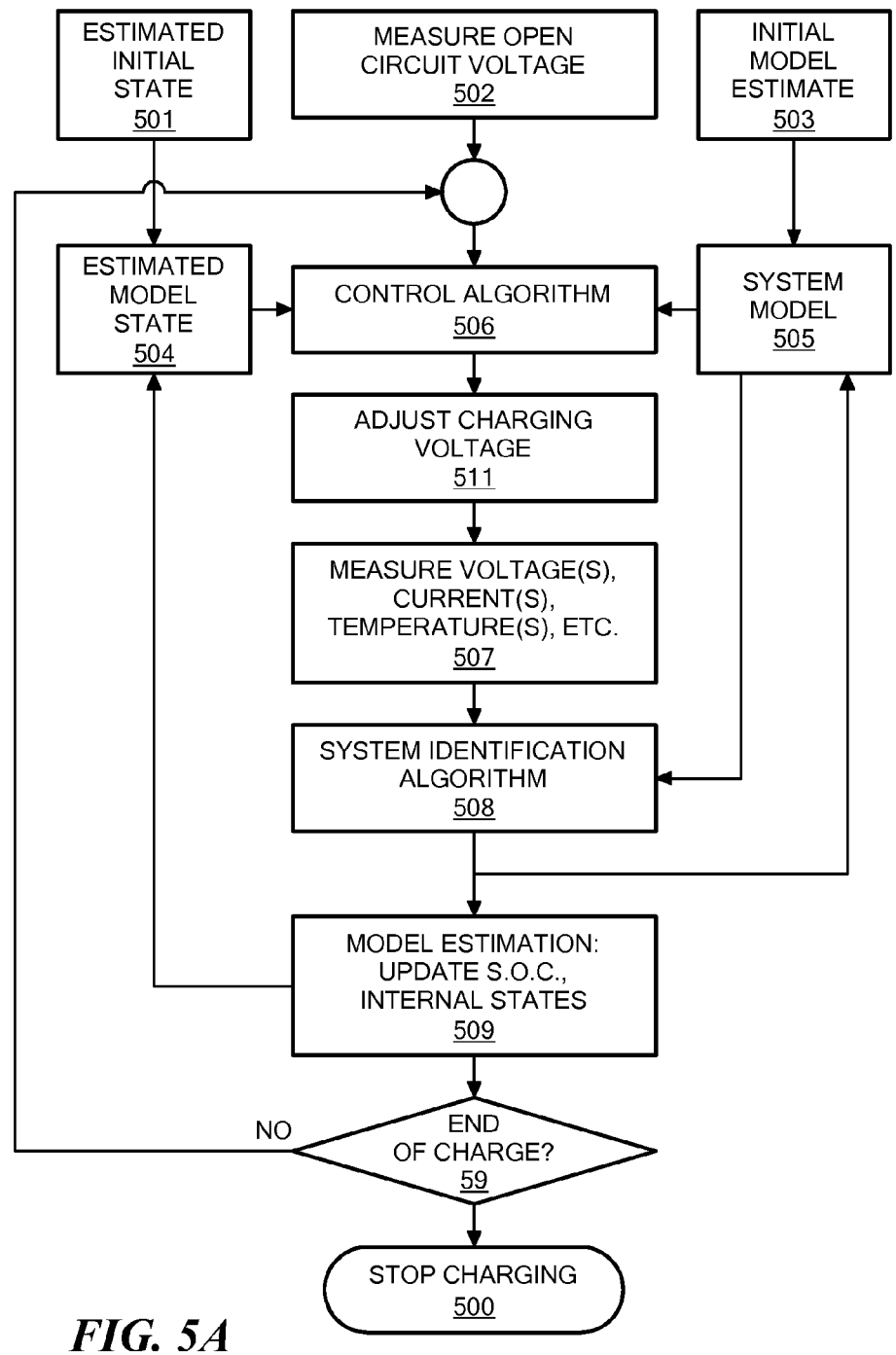
FIG. 5A is a flowchart depicting a method for charging a battery applying a solution to a charging problem, in accordance with an embodiment of the present invention.

Once either an optimal, or a satisfactory, solution is found to the charging problem, that solution is used to charge the battery, in accordance with the flow chart presented in FIG. 5A. The open circuit voltage $V_{OC}$ is measured 502. The estimated initial state (501) and initial model estimate (503) also serve as inputs, from which the estimated model state (504) and system model (505) are derived, respectively. By application of a control algorithm (506), as elsewhere described herein or otherwise, the charging voltage (or current) is adjusted (511). Values of system parameters, such as one or more voltages, one or more currents, one or more temperatures, etc., continue to be measured (507). In particular, the total charge that has been stored in the battery is tracked as a basis for determining an optimized charging current.

A system identification algorithm is applied (508), as elsewhere described herein, providing for model estimation (509) and the update of the state of charge, internal states, etc., reflected in an update of the system model.

As now described with reference to FIG. 14, during the course of measurement, which may be performed during charge, discharge, or quiescence, circuit parameters may be perturbed (510), as by imposing a modulation of current or voltage, preferably at a rate exceeding 100 Hz and more than 10,000 data points and characterized as "high-frequency" modulation. Thus a "Fast Charge" taking three minutes (or 180 s) sampled at 1 kHz would result in 180,000 sampled data points in time. A perturbation of any waveform may be imposed within the scope of the present invention, but normally is designed such that it provides enough excitation over the frequency range of interest. Once a model is obtained, the model itself may be used to compute either an optimal or more efficient excitation that may subsequently be used in further experimentation. Measurements made in conjunction with the perturbation, or otherwise, provide for updating data, parametric or otherwise, constituting the battery model.

Control algorithm (506) is employed, generally, to minimize the difference between the measure internal battery voltage and current with respect to the desired voltage and current. Minimization with respect to any norm is within the scope of the present invention; however a preferred norm is the absolute value or square of the difference between the calculated internal battery voltage and a specified target internal battery voltage. Any of the known techniques in control theory could be used to this end, and may involve numerical minimization techniques, model inversion and charging profiles can be either pre-estimated from the model and models could also be used to compute, in real time, how the current or voltage needs to be changed.

In accordance with certain embodiments of the invention, a maximum current is applied, at any juncture in the charging process, subject to a set of battery-specific constraints.

On the basis of a solution provided by the control algorithm, the charging voltage Vs is adjusted (506). Battery parameters, including internal state variables x of the device and vector model parameters p and limits b as well, are then recalculated, and if the charge is completed (59) the process ends (500), otherwise, the process is iterated.

Figure 5B:
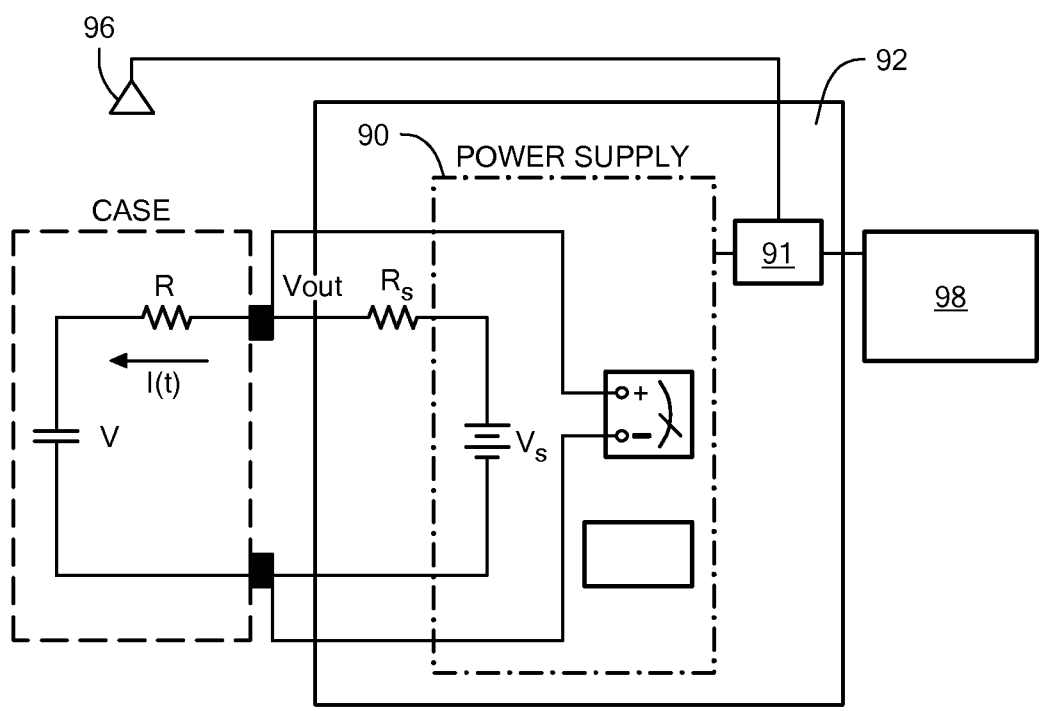
FIG. 5B depicts a representative circuit for interrogating the state of charge of a battery and for implementing a fast battery charge in accordance with embodiments of the present invention.

Referring now to FIG. 5B, charger 90 for fast charging typically employs a processor 91 for implementation of the fast charging. In accordance with embodiments of the present invention, processor 91 may store current and historical model data and values of internal battery states in memory 98.

Typically a computer controlled power supply 38 (shown in FIG. 3) is used, with a processor 39 setting parameters, such as the output voltage and maximum current, at a typical frequency of 10 Hz or higher. Processor 39 may have an input for receiving a signal from at least one sensor sensitive to a characteristic of the battery, including, for example, temperature or pH, or a data obtained from the battery, such as battery type, batch, date of fabrication, using either an optical reader, RFID (active or passive) tag, high frequency modulation on top of the battery voltage, etc., as well as from a communication with a micro-chip that keeps data such as number of recharging cycles to which a battery has been subjected.

Processor 39 may also govern temperature controller 37. Within the scope of the present invention, portions of the control algorithm may be executed by hardware or software either within the power supply itself or external to the power supply, and the power supply may be configured such that only the maximum output current to be delivered by the power supply need be provided to the power supply.

In all cases, it is critical not to exceed the device limits as the device performance and lifetime may irreversibly affected if limits are exceeded only by a relatively small value. Therefore, in accordance with preferred embodiments of the invention, voltage, current and temperature are each measured with a high level of accuracy, preferably with a precision of 16 to 24 bits, in order to achieve an accurate control and preserve device performance. Further discussion of measurement accuracy requirements is provided below.

Figure 6:
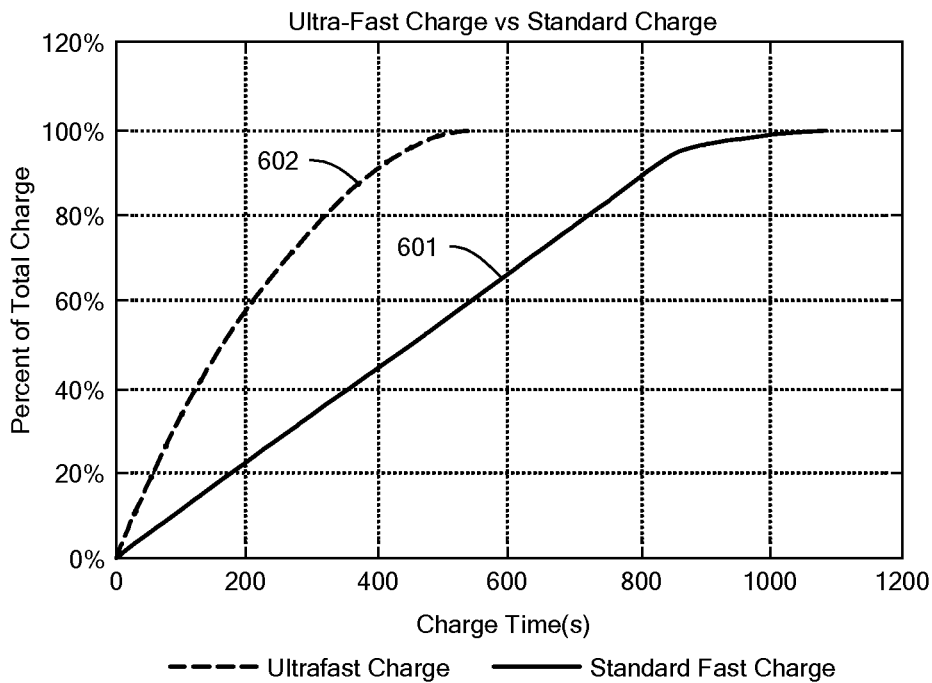
FIG. 6 compares battery charge rates in accordance with an embodiment of the present invention with those provided by manufacturer-specified procedures.

FIG. 6 compares charging times using an ultra-fast charge algorithm in accordance with the present invention with fastest charge time recommended by the battery manufacturer. Curve 601 depicts the time progression of a charge in accordance with manufacturer recommendations, indicating that eighty percent of the total charge is attained in 720 seconds. By contrast, practice in accordance with the teachings of the present invention lead to the charging profile of curve 602 in which eighty percent of the total charge is attained 322 seconds, for a 56% reduction in charge time.

Figure 7:
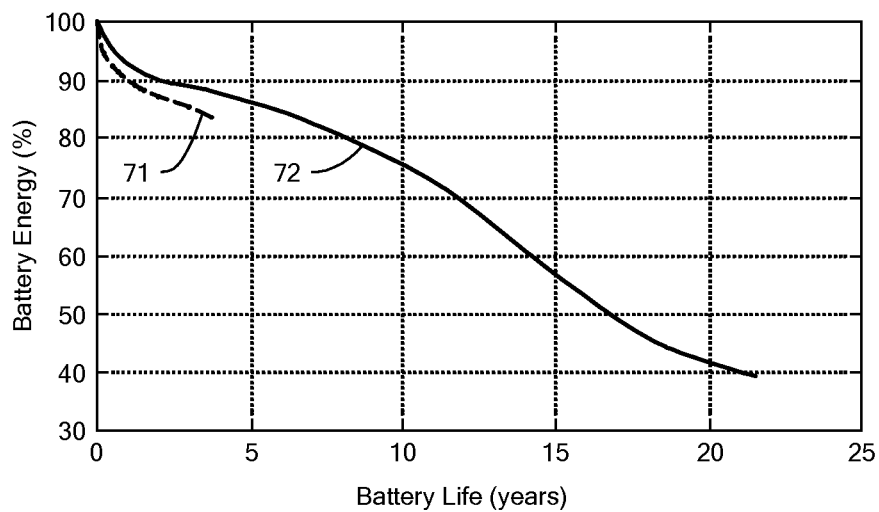
FIG. 7 compares battery lifetime in accordance with an embodiment of the present invention with those provided by manufacturer-specified procedures.

FIG. 7 compares the total energy stored in the battery (expressed as a percentage of initial capacity) as a function of time, based upon an assumed charge/discharge cycle of once per day. After 7,800 charge/discharge cycles performed in accordance with an embodiment of the present invention, the energy capacity, plotted by curve 72, decreased to 39% of its initial value. The battery energy decreased to 90% in 2 years 2 months (789 charge/discharge cycles), 85% after 5 years 9 months (2115 charge/discharge cycles) and to 80% after 8 years and two months (2995 charge/discharge cycles). The charging procedures recommended by the manufacturer lead to a degradation, depicted by curve 71, to 90% of the initial charge after 550 cycles and 84% after 1400 cycles. Improved battery life in accordance with an embodiment of the present invention is evident in comparison to normal degradation rates.

Various modes of battery parameter tracking are encompassed within the scope of the present invention. In accordance with one mode of battery parameter tracking, with each charge cycle the battery parameters may be re-estimated either iteratively in real-time as the charge progresses, or by keeping in memory all the measured signals at each iteration and re-calculating the parameters after the charge is completed.

Determining Battery Constraints

Typically, exact values for the device constraints, in terms of maximum or minimum values not to be exceeded when charging the device (vector b in Eqn. 2), are either unknown or known with a large uncertainty and have to be determined experimentally. By their very nature these experiments may involve destructive tests, and may potentially require a large number of devices before that the requisite data is obtained.

Some of the limits are supplied by battery manufacturers, and the published limits provide very useful starting points from which better values can be obtained as a function of the particular objective to be attained. For example when the objective is to achieve a very fast charge it might be acceptable to relax requirements on the acceptable degradation of the battery performance over the specified number of charge-discharge cycles.

Figure 8:
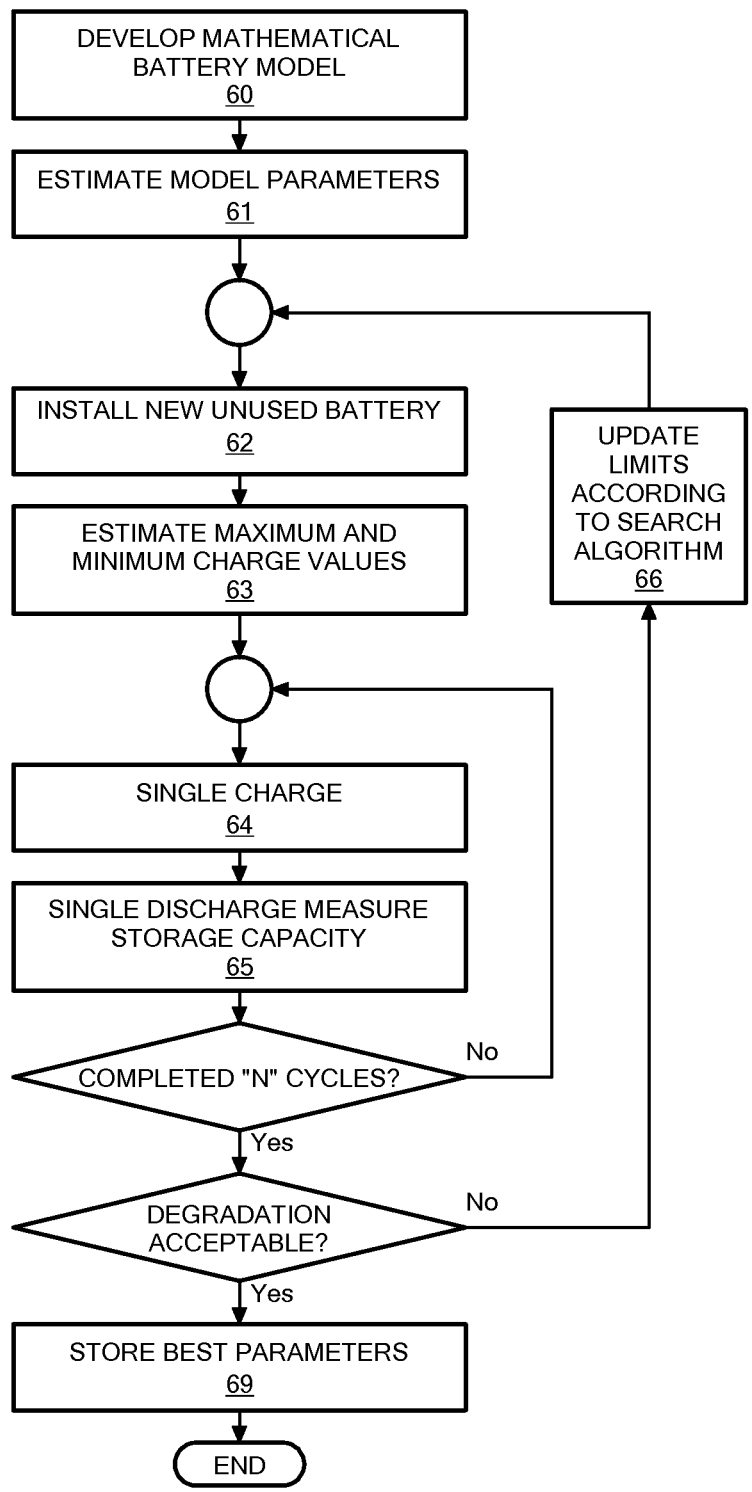
FIG. 8 is a flowchart depicting a method for establishing battery and model parameters associated with a battery, in accordance with an embodiment of the present invention.

The flowchart in FIG. 8 depicts an iterative testing procedure, in accordance with one embodiment of the invention, by which charging parameters and limits may be determined. On the basis of a battery model that is developed (60) and a set of model parameters concordant with the battery model, an initial set of model parameters is estimated (61). An unused battery is installed (62) and its maximum and minimum charge values estimated (63), based on particular features (battery type, capacity, etc.) of the battery being tested. The battery is charged (64) and discharged (65) for a specified number N of cycles. The charging method follows the algorithm described above with reference to FIG. 5, while the discharge follows the estimated anticipated usage of a battery. At each cycle values such as the amount of energy required to charge the battery, the amount of energy obtained in discharging the battery, and re-estimated parameters values are stored in memory. The search continues until best parameters are found and stored (69).

An objective function, providing a measure of degradation is re-calculated and used in a search algorithm (66), such as a standard random search, hill-climbing technique, or any elaborations thereon. Since the characteristics of the battery can be expected to have been altered by the test, a new battery must be used at the beginning of each new series of charge-discharge cycles.

Using Field Data for Improving Models and Charging Methods

Figure 9:
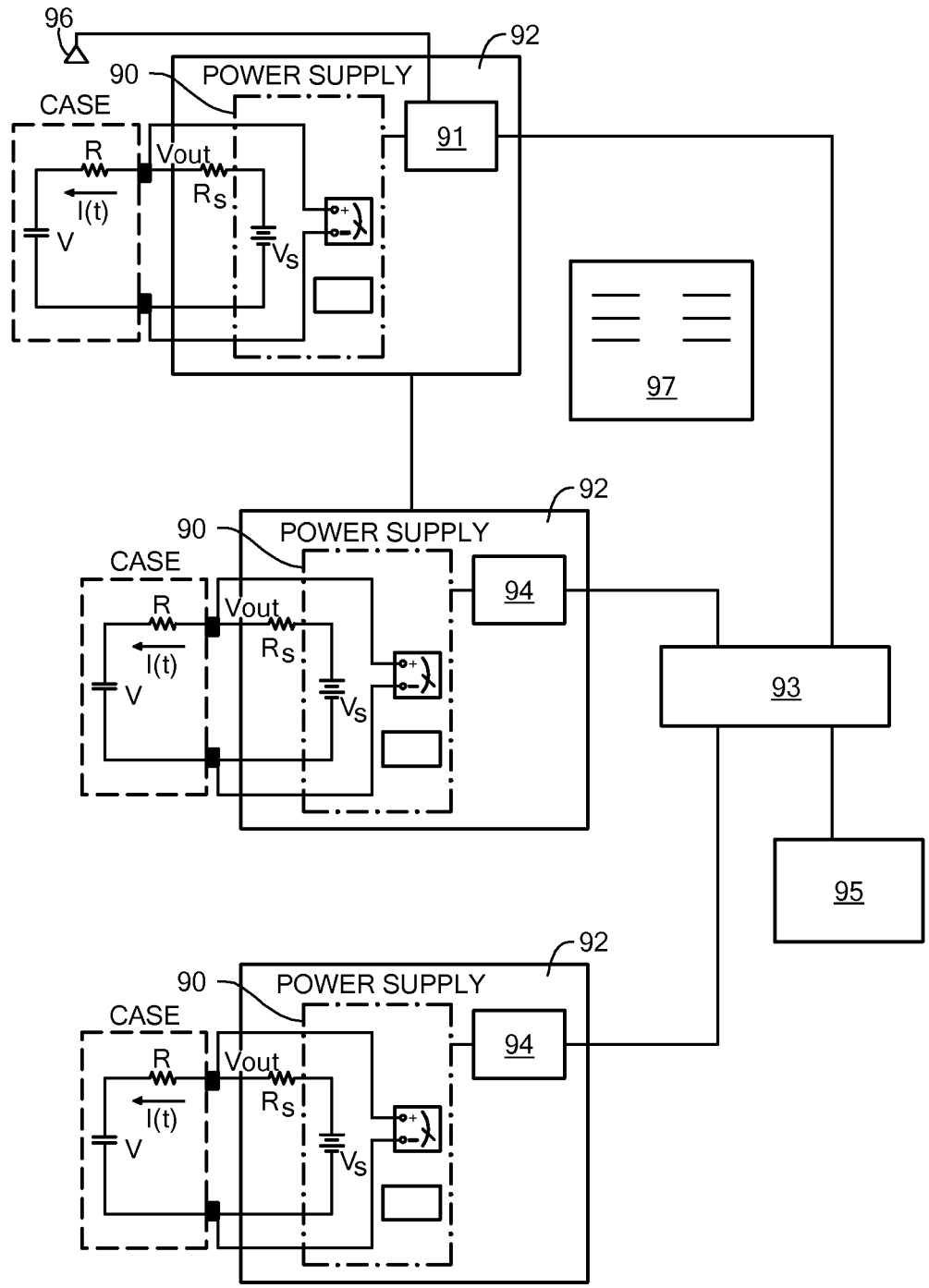
FIG. 9 depicts an aggregation of a plurality of chargers whereby data are pooled to facilitate optimization of charging parameters, in accordance with embodiments of the present invention.

Referring now to FIG. 9, chargers 90 developed for fast charging typically employ a processor 91 for their implementation. Charging systems 92 are often used where either network connections to the internet or to a local network 93 are available. In accordance with embodiments of the present invention, by providing processor 91 with enough memory to store data measured during charge and discharge cycles, when a network connection is detected, measured battery data that has been stored by the processor is transferred to one or more other processors 94 on the network, or to a remote server 95 on the internet. At the same time the processor 91 obtains updated data on the battery model, optimal charging parameters and charging algorithm.

Measurement procedures and processes for calculation of optimal charging regimens are preferably those described herein with respect to the fast charging of a single cell, and include, in particular, any of the previously described techniques including nonlinear system identification.

In alternative embodiments of the present invention, charging system 92 include a sensor 96 enabling processor 91 to obtain battery codes such as battery model, manufacturer, batch number, fabrication date, factory pre-determined model and charging parameters directly from a battery coupled to charging system 92. This may be achieved using a bar code on the battery, read by sensor 76, such as line CCD array. Database 97, or any other way to store data, is within the scope of the present invention, and includes active RFID tags, powered by the battery under charge, or otherwise.

Processor 91 adjusts its charging algorithm as a consequence of data received from other processors 94, incorporating, also, all data it collects with the battery model and characteristics, when the data is transmitted back to server 95.

Typically, lithium ion batteries are manufactured with a tight manufacturing tolerance, such that variations from device to device are relatively small. However small they are, however, the optimal charging process is highly sensitive to certain device parameters. The vast amount of data with respect to a class of cognate batteries, as collected by servers, in accordance with embodiments of the present invention, advantageously allows improvement of models and more accurate estimation of model parameters. In particular, parameter adjustment based, at least in part, on batch or time of fabrication of the batteries, is advantageously enabled.

Global Optimization

Finding optimal limits to use for fast-charging batteries requires a large number of trials, each of which initially requires a new battery. This may be complicated by the possible variations between devices themselves introducing "noise," or random perturbations, into the optimization process. It is typically possible to find adequate charging parameters in the first initial stages of the optimization process described above with reference to FIG. 8. From that point, the optimization process only involves very small perturbations on the parameter values, and does not very significantly affect the lifetime of the devices. Later stages of optimization may be obtained by farming out the process to chargers 90 already existing in the field. When connecting to servers 95, they may be instructed about the next charging parameters to use in the optimization process. The microprocessors 94 then return the results to the server 95 as iterations are completed.

Figure 10:
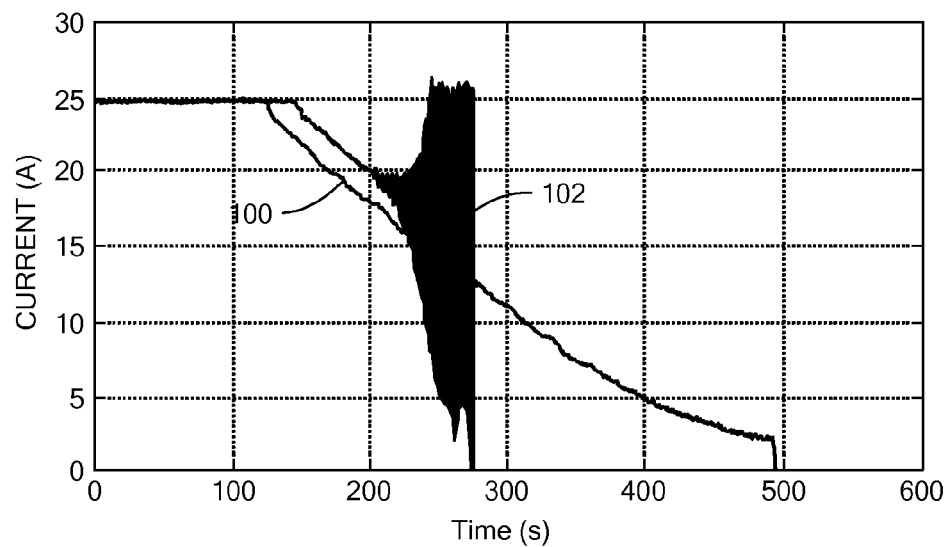
FIG. 10 depicts the onset of current instability resulting from a small change in a model parameter.

The sensitivity of charging protocols to both model parameters and measured battery quantities, in accordance with embodiments of the present invention, is depicted in FIG. 10. The model employed is that of FIG. 3. The charging current starts at 25 A, and tapers down after that the estimated internal voltage reached a nominal value of 3.55. Taking into account the internal drop represented by the resistive element R, the external charging voltage is allowed to exceed the recommended maximum battery charging voltage of 3.6V.

Figure 11:
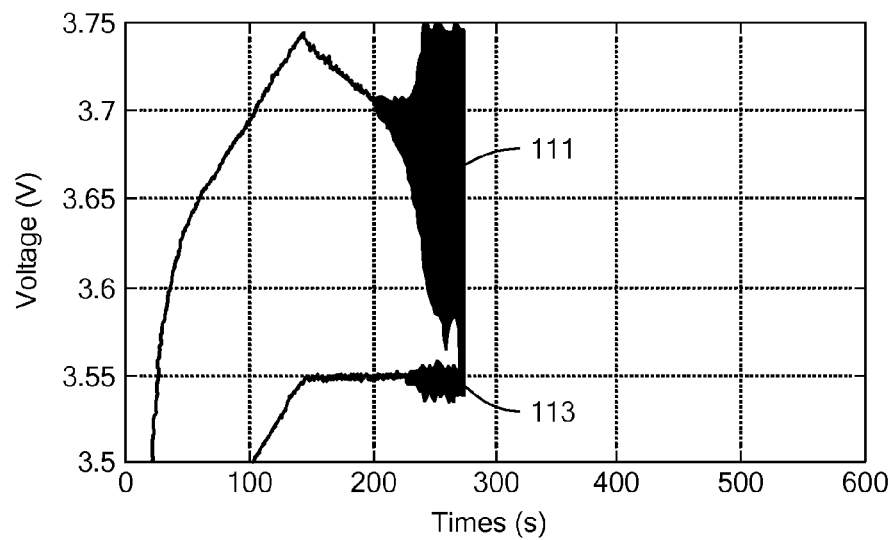
FIG. 11 depicts the onset of a corresponding instability in output and internal voltage.

The charging profile normally observed in lithium ion cells, when methods of the present invention are employed, is designated by numeral 100, where the estimated internal resistance R was 6 mΩ. However, with an assumed internal resistance of 8 mΩ, the charging process became unstable after 200 seconds when the current, plotted in curve 102, decreased to 20 A. Referring to FIG. 11, at 225 seconds, the voltage (curve 111) was oscillating by ~20 mV, and the instability increased with time. However the oscillation in the estimated internal cell voltage, plotted in curve 113 never exceeded a few mV, reaching only 3.556 V, and exceeding the maximum preset safe charging voltage of 3.55V by on the order of 6 mV.

Since the internal cell voltage is estimated on the basis of $V=V_{out}-R \times I$, both V and R×I must be established to within the accuracy required for determining the internal voltage, and that is on the order of 1 mV. A/D (and D/A) converters typically employed in battery charging applications, with 12-bit accuracy and voltage ranges of ±5V or ±10V, provide a nominal 1 bit precision of 2.4 mV or 4.8 mV respectively, that is generally inadequate since uncertainty of the internal voltage at levels greater than ~1 mV causes instability of the charging process and limited battery lifetime. Therefore 16-bit devices are preferred for implementing an ultra-fast charge algorithm.

The described embodiments of methods for deriving battery parameters and for charging batteries on the basis of the parameters thus derived, may be implemented as a computer program product for use with a computer system. Such implementations may include a series of computer instructions fixed either on a tangible medium, such as a computer readable medium (e.g., a diskette, CD-ROM, ROM, or fixed disk)

or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). some embodiments of the invention may be implemented as a combination of both software (e.g., a computer program product) and hardware. Still other embodiments of the invention are implemented as entirely hardware, or entirely software (e.g., a computer program product).

The described embodiments of the invention are intended to be merely exemplary and numerous variations and modifications will be apparent to those skilled in the art. All such variations and modifications are intended to be within the scope of the present invention as defined in the appended claims.

What is claimed is:

1. An apparatus for charging a target battery, the apparatus comprising:
   a. an interface for electrical coupling to the target battery;
   b. circuitry for concurrently measuring voltage and current of the target battery;
   c. a database for accumulating battery parameter data from a plurality of other batteries; and
   d. a processor adapted to recursively update a dynamic representation of the target battery based both on jointly measured voltage and current of the target battery and accumulated battery parameter data received from the database for the plurality of other batteries; and
   e. a current supply for supplying current for charging the target battery as governed by the processor based on the recursively updated dynamic representation of the target battery.

2. An apparatus according to claim 1, wherein the processor is adapted for updating the dynamic representation of the target battery based at least in part upon a system identification technique.

3. An apparatus according to claim 1, wherein the processor is adapted for updating the dynamic representation of the target battery based at least in part upon nonlinear system identification.

4. An apparatus according to claim 1, wherein the circuitry for concurrently measuring voltage and current of the target battery includes a four-port configuration.

5. An apparatus according to claim 1, wherein the interface for electrical coupling to the battery is adapted for coupling to reference electrodes of the target battery.

6. An apparatus according to claim 1, wherein the processor further comprises an input for receiving a signal from a sensor sensitive to a characteristic of the target battery.

7. An apparatus according to claim 1, further comprising a temperature controller for controlling a temperature of the target battery.

8. A method for charging a battery, the method comprising:
   a. providing a nonlinear dynamic representation of cell dynamics for the battery;
   b. employing an optimization routine to determine, by applying the optimization routine to maximize or minimize an objective function derived from the nonlinear dynamic representation subject to a set of constraints, an optimized charging profile for the battery based, at least in part, on the nonlinear dynamic representation and on tracking one or more system variables for the battery; and
   c. applying a charging current to the battery based, at least in part, on the optimized charging profile.

9. A method according to claim 8, wherein determining the optimized charging profile is also subject to a set of battery-specific constraints.

10. A method according to claim 9, further comprising deriving the set of battery-specific constraints based on an iterative sequence of charge/discharge cycles.

11. A method according to claim 8, wherein the optimized charging profile is an optimized charging current profile.

12. A method according to claim 8, further comprising tracking temperature of the battery, and wherein determining the optimized charging profile is also based, at least in part, on the tracked temperature of the battery.

13. A method according to claim 8, wherein determining the optimized charging profile is based at least in part on tracking instantaneous state variables for the battery.

14. A method according to claim 8, wherein tracking the total charge comprises determining at least one instantaneous internal state variable for the battery during charging the battery.

15. A method according to claim 8, wherein tracking the total charge comprises determining at least one instantaneous internal state variable for the battery during discharging the battery.

16. A method according to claim 8, wherein the nonlinear dynamic representation of cell dynamics for the battery is derived by means of nonlinear system identification.

17. A method according to claim 8, wherein the nonlinear dynamic representation of cell dynamics for the battery includes a set of internal state variables.

18. A method according to claim 8, the nonlinear dynamic representation of cell dynamics for the battery includes a set of model parameters.

19. A method according to claim 8, wherein the nonlinear dynamic representation of cell dynamics for the battery includes non-parametric data characterizing a model, at least in part.

20. A method according to claim 8, wherein determining an optimized charging profile for the battery based on the nonlinear dynamic representation is performed during a course of discharging the battery.

21. A method according to claim 8, wherein determining an optimized charging profile for the battery based on the nonlinear dynamic representation is performed during a course of charging the battery.

22. A method according to claim 18, wherein the set of model parameters includes parameters derived from a database.

23. A method according to claim 18, the set of model parameters includes parameters derived from a database updated during the course of charging the battery.

24. A method according to claim 8, wherein the nonlinear dynamic representation of cell dynamics for the battery includes a set of internal state variables specific to a particular individual cell.

25. A method according to claim 8, wherein the nonlinear dynamic representation of cell dynamics for the battery includes a set of model parameters specific to a genus of cells.

26. A method according to claim 8, wherein providing the nonlinear dynamic representation is based, at least in part, on data gathered from charge/discharge cycles of a plurality of networked charging systems.

27. A network for deriving empirical battery model data, the network comprising:
   a. a plurality of charging systems, each charging system including a processor and a power supply for supplying current to a separate battery of a plurality of batteries; and
   b. a server adapted to receive from each of the plurality of processors data obtained from each of the plurality of batteries and to return updated data with respect to an empirical dynamic model of cell dynamics for incorporation by each of the plurality of charging systems, wherein the updated data are derived a least in part from a database of accumulated data obtained from each of the plurality of batteries.

28. A network according to claim 27, wherein the processor of at least one of the plurality of charging systems is adapted for updating a dynamic representation of cell dynamics for the battery based at least in part upon a system identification technique.

29. A network according to claim 27, wherein the processor of at least one of the plurality of charging systems is adapted for updating a dynamic representation of cell dynamics for the battery based at least in part upon nonlinear system identification.

30. A method according to claim 8, wherein the nonlinear dynamic representation has a linear dynamic part and a static nonlinear part.

31. A method according to claim 8, wherein the nonlinear dynamic representation is a Wiener model.

32. A method according to claim 8, wherein the nonlinear dynamic representation is a Hammerstein model.

33. A method according to claim 8, wherein the nonlinear dynamic representation is a finite order Volterra series.

34. A method according to claim 8, wherein the one or more system state variables for the battery includes total charge stored in the battery.

35. A method according to claim 8, wherein determining the optimized charging profile comprises:
   while charging the battery, repeatedly deriving updated nonlinear dynamic representations of cell dynamics for the battery; and
   using the updated nonlinear dynamic representations to determine the optimized charging profile.

36. A method according to claim 35, wherein deriving updated nonlinear dynamic representations of cell dynamics for the battery comprises using nonlinear system identification techniques to derive the updated nonlinear dynamic representations.

37. A method according to claim 35, wherein the updated nonlinear dynamic representations have a linear dynamic part and a static nonlinear part.

* * * * *